(12) United States Patent
Pearson et al.

(10) Patent No.: US 10,176,627 B2
(45) Date of Patent: Jan. 8, 2019

(54) TREE-BASED GRAPHICS PRIMITIVE RENDERING

(71) Applicant: ARM Limited, Cambridge (GB)

(72) Inventors: Brian Pearson, Trondheim (NO); Ting Wei, Trondheim (NO); Sergey Solovyev, Trondheim (NO); Andreas Danner Nilsen, Trondheim (NO); Alexander Galazin, Trondheim (NO); Michel Iwaniec, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 14/639,867

(22) Filed: Mar. 5, 2015

(65) Prior Publication Data
US 2015/0269773 A1 Sep. 24, 2015

(30) Foreign Application Priority Data
Mar. 19, 2014 (GB) .................................. 1404924.1

(51) Int. Cl.
*G06T 17/00* (2006.01)
(52) U.S. Cl.
CPC .................................. *G06T 17/005* (2013.01)
(58) Field of Classification Search
None
See application file for complete search history.

(56) References Cited

U.S. PATENT DOCUMENTS

| 5,977,977 | A | * | 11/1999 | Kajiya | G06T 11/001 345/418 |
|---|---|---|---|---|---|
| 2009/0106530 | A1 | * | 4/2009 | Lauterbach | G06T 15/40 712/30 |
| 2009/0167763 | A1 | * | 7/2009 | Waechter | G06T 15/06 345/426 |
| 2010/0239186 | A1 | * | 9/2010 | Fowler | G06T 15/06 382/291 |
| 2013/0069943 | A1 | * | 3/2013 | Kallio | G06T 15/005 345/420 |
| 2013/0265298 | A1 | | 10/2013 | Moon | |

(Continued)

OTHER PUBLICATIONS

GB Search Report, dated Sep. 22, 2014, GB Patent Application GB1404924.1.

(Continued)

*Primary Examiner* — Edward Martello
(74) *Attorney, Agent, or Firm* — Vierra Magen Marcus LLP

(57) ABSTRACT

A set of primitives is divided into plural sub-sets of primitives, and a tree representation for representing the set of primitives in which each leaf node of the tree represents one of the sub-sets, and each parent node of the tree represents a sub-set of primitives corresponding to the combination of the sub-sets of primitives of all of its child nodes, is generated. For each node of the tree representation data indicating: the sub-set of primitives that the node represents; the vertices that are used by the primitives in the sub-set of primitives that the node represents; and the volume of space that the sub-set of primitives that the node represents falls within, is determined. The tree representation is then used to determine a set of primitives and a set of vertices to be processed when processing the set of primitives for the output frame.

23 Claims, 4 Drawing Sheets

(56) References Cited

U.S. PATENT DOCUMENTS

2014/0118391 A1* 5/2014 Hakura ............... G06T 15/005
            345/619

OTHER PUBLICATIONS

Lin, et al., "Collision detection between geometric models: a survey," University of North Carolina, 1998.
Zachmann, "Minimal Hierarchical Collision Detection," University of Bonn, Germany, 2002.
The ryg blog, View frustum culling, Oct. 17, 2010, available at: https://fgiesen.wordpress.com/2010/10/17/view-frustum-culling/.
Teschner, et al., "Optimized Spatial Hashing for Collision Detection of Deformable Objects," Computer Graphics Laboratory, Munich, Germany, Nov. 19-21, 2003.
Teschner, et al., "Optimized Spatial Hashing for Collision Detection of Deformable Objects," Vision Modeling and Visualization 2003, Korea University.
Quinlan, "Efficient Distance Computation between Non-convex Objects," Stanford University, 1994.
Clark, "Hierarchical Geometric Models for Visible Surface Algorithms," University of California Santa Cruz, 1976.
Klosowski, et al., "Efficient Collision Detection using Bounding Volume Hierarchies of k-DOPs," IEEE Transactions on Visualization and Computer Graphics, vol. 4, No. 1, Jan.-Mar. 1998.
Zhang, et al., "Visibility Culling using Hierarchical Occlusion Maps," University of North Carolina, 1997.
Van den Bergen, "Efficient Collision Detection of Complex Deformable Models using AABB Trees," Journal of Graphics Tools, vol. 2, Issue 4, Apr. 1997.
Assarsson, et al., "Optimized View Frustum Culling Algorithms for Bounding Boxes," Journal of Graphics Tools, vol. 5, No. 1:9-22, 2000.

* cited by examiner

TREE-BASED GRAPHICS PRIMITIVE RENDERING

BACKGROUND

The technology described herein relates to graphics processing systems and in particular to methods of and apparatus for identifying primitives and vertices to be rendered when rendering an output in a graphics processing system.

Computer graphics systems typically render frames, e.g. for display, by processing so-called primitives, which are usually simple polygons such as triangles. The primitives for a frame will usually be listed in the order that they are to be rendered, and each primitive will have associated with it a set of vertices which are referred to by their index in an associated vertex array. Thus, the graphics processing system will typically receive a sequence of primitives to be rendered, and will process the primitives in turn to generate the output frame. A given frame to be rendered may contain tens of thousands of primitives.

One issue with graphics processing is that some primitives defined for a frame may in fact not be visible in the final output because, e.g. they fall outside the view frustum. It is known therefore to try to identify such primitives before a frame is rendered, so as to avoid processing those primitives.

However, the Applicants have now recognised that although such techniques can be used to avoid processing primitives that fall outside the view frustum, in practice such techniques may not reduce significantly the number of vertices that are processed (e.g. because the vertex processing is performed on all the vertices in the vertex array). Such vertex processing can be a significant burden, and while this may not be such an issue in more powerful desktop systems that have significant bandwidth resources, the Applicants have recognised that it would be advantageous to try to reduce the amount of vertex processing that is done, particularly in graphics processing systems for lower powered and portable devices that may have more constrained bandwidth and processing resources.

The Applicants believe therefore that there remains scope for improved methods of and apparatus for identifying primitives and vertices to be rendered in graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
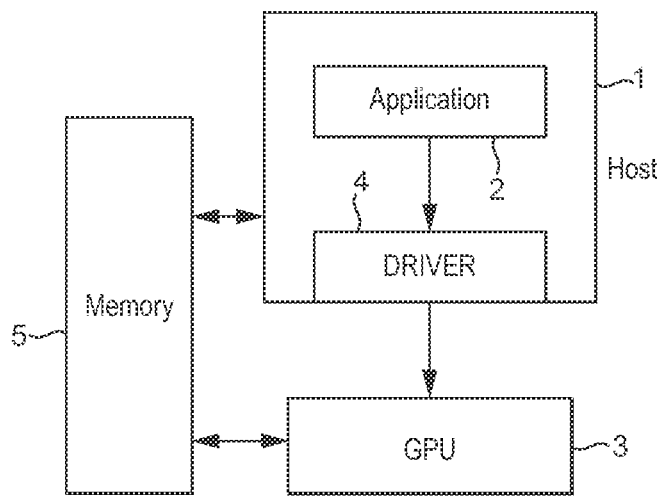
FIG. 1 shows an exemplary computer graphics processing system.

A first embodiment of the technology described herein comprises a method of processing a set of plural primitives to be processed for a frame for output in a graphics processing system, each primitive in the set of primitives being associated with one or more vertices, the method comprising:

dividing the set of primitives into plural sub-sets of primitives;

generating a tree representation for representing the set of primitives, the tree representation being configured such that each leaf node of the tree represents one of the sub-sets that the set of primitives has been divided into, and each parent node of the tree represents a sub-set of primitives corresponding to the combination of the sub-sets of primitives of all of its child nodes;

and generating and storing for each node of the tree representation, data indicating the sub-set of primitives that the node represents, data indicating the vertices that are used by the primitives of the sub-set of primitives that the node represents, and data indicating the volume of space that the sub-set of primitives that the node represents falls within.

A second embodiment of the technology described herein comprises an apparatus for processing a set of plural primitives to be processed for a frame for output in a graphics processing system, each primitive in the set of primitives being associated with one or more vertices, the apparatus comprising:

processing circuitry configured to:

divide the set of primitives into plural sub-sets of primitives;

generate a tree representation for representing the set of primitives, the tree representation being configured such that each leaf node of the tree represents one of the sub-sets that the set of primitives has been divided into, and each parent node of the tree represents a sub-set of primitives corresponding to the combination of the sub-sets of primitives of all of its child nodes;

and generate and store for each node of the tree representation, data indicating the sub-set of primitives that the node represents, data indicating the vertices that are used by the primitives of the sub-set of primitives that the node represents, and data indicating the volume of space that the sub-set of primitives that the node represents falls within.

A third embodiment of the technology described herein comprises a data structure representing a set of plural primitives to be processed for a frame for output in a graphics processing system, each primitive in the set of primitives being being associated with one or more vertices, the data structure comprising:

data representing a tree representation representing the set of plural primitives; wherein:

the tree representation that the data represents is configured such that each leaf node of the tree represents one of a plurality of sub-sets of primitives that the set of primitives has been divided into, and each parent node of the tree represents a sub-set of primitives corresponding to the combination of the sub-sets of primitives of all of its child nodes;

and the data that is stored for each node of the tree representation indicates:

the sub-set of primitives that the node represents;

the vertices that are used by the primitives of the sub-set of primitives that the node represents; and the volume of space that the sub-set of primitives that the node represents falls within.

In the technology described herein, a set of primitives to be rendered when generating an output frame in a graphics processing system is processed to generate a tree representation that represents the set of primitives and in which respective nodes of the tree represent respective sub-sets of primitives within the set of primitives. For each node, the sub-set of primitives and the corresponding vertices associated with those primitives are identified and indicated.

As will be discussed further below, representing the set of primitives using such a tree structure facilitates more effectively identifying primitives in the set of primitives, and vertices associated with the primitives in the set of primitives, that do not in fact need to be processed when rendering an output frame, thereby reducing the processing burden when rendering the set of primitives. In particular, and in contrast to known techniques, the tree representation of the technology described herein can be used, inter alia, not only to reject primitives from further processing if they lie outside the view frustum, but also to efficiently and effectively avoid the processing of vertices if they lie outside the view frustum (it can, e.g., allow a reduced or minimal list of vertices to be processed to be built, before significant vertex processing takes place). This can then provide significant savings in bandwidth, power, etc., when rendering an output frame and is, accordingly, particularly advantageous in the context of graphics processing systems for use in lower powered and/or portable devices.

Furthermore, and as will be discussed further below, the technology described herein can operate without any "assistance" or "input" from the application (e.g.) that requires the rendering. This then removes any need for the application programmer (e.g.) to attempt to configure their application to try to avoid (e.g.) the processing of primitives and/or vertices outside the view frustum.

The frame for output that is to be rendered in the technology described herein can be any suitable and desired output frame that is to be generated by the graphics processing system. In one embodiment, it is an output frame for display (on a screen or via a printer, for example), but it could equally be any other form of output that a graphics processing system can be used to produce, such as a texture (e.g. in a render-to-texture process), or any other form of output data array.

The set of primitives may be any suitable set of primitives that is to be processed to generate the output frame. It may comprise any desired and suitable number of primitives. In an embodiment it comprises a few thousand or a few tens of thousands (e.g. 20,000) primitives. The primitives in the set may be listed in their desired rendering order. Each primitive in the set of primitives may have, and in an embodiment does have, an associated index value, that can be used to identify the primitive. The primitive index values may correspond to, and thus indicate, the positions of the primitives in the rendering order for the set of primitives (thus the primitives may be indexed (e.g. from low to high) in their rendering order).

The set of primitives may comprise all of the primitives that are to be processed to generate the output frame, but in an embodiment comprises some but not all of the primitives to be processed to generate the output frame. In this latter case, the set of primitives may comprise a particular, identifiable set of primitives for the frame, such as the set of primitives for a given draw call for the frame. Thus, in one embodiment, the set of primitives comprises the set of primitives for a draw call for the output frame.

Where the set of primitives does not comprise all the primitives for the output frame (i.e. there are plural sets of primitives (e.g. draw calls) to be processed for the output frame), then the process of the technology described herein may be performed for plural of the sets of primitives (e.g. draw calls) for the output frame (and may be repeated for each set of primitives (e.g. draw call) of the output frame).

Where plural sets of primitives are being processed in the manner of the technology described herein, then in an embodiment, data generated for one set of primitives can be retained (e.g., cached) for use with another (e.g. subsequent) set of primitives (where it is appropriate and (potentially) useful to do that).

The set of primitives can be divided into plural sub-sets of primitives in any suitable and desired manner. The set of primitives may be divided into equal sub-sets. Thus each sub-set may contain the same or a similar number of primitives.

In an embodiment, the primitives in the set of primitives are divided into sub-sets of primitives based on their rendering order. Sub-dividing the set of primitives on this basis avoids any need to consider the spatial distribution of the primitives when assigning them to nodes and thus can be performed in a relatively fast and inexpensive fashion.

Where the primitives have associated indices, then the set of primitives may accordingly be divided into sub-sets based on the primitives' index values. In this case, the range of index values for the set of primitives may be divided into plural, e.g. equal, sub-ranges of index values, with each sub-set of primitives corresponding to a respective sub-range of the primitive index values.

Each sub-set of primitives can contain any desired number of primitives, but in an embodiment the sub-division is done (subject to any other constraints) such that each sub-set of primitives does not contain more than a selected, e.g. predetermined, threshold number of primitives (of primitive indices), such as 128 primitives. The number of sub-sets of primitives accordingly may comprise however many sub-sets the set of primitives must be divided into to ensure that each sub-set has less than the threshold number of primitives.

The primitive set sub-division process may also or instead be subject to a constraint that the total number of sub-sets of primitives does not exceed a selected, e.g. predetermined, threshold number of sub-sets, such as 256 sub-sets. This constraint may take precedence, such that if the threshold number of sub-sets will be exceeded, the allowed number of primitives per sub-set is increased until the threshold number of sub-sets will not be (and is not) exceeded.

Other arrangements for sub-dividing the set of primitives would be possible, if desired.

Once the set of primitives has been divided into plural sub-sets of primitives, a tree representation of the set of primitives is generated, with each leaf node of the tree corresponding to a respective sub-set that the set of primitives has been divided into (thus there will be the same number of leaf nodes as there are sub-sets of primitives).

The sub-sets of primitives can be assigned to respective leaf nodes in any desired and suitable manner. In an embodiment the primitive sub-sets are assigned to the leaf nodes in a manner that facilitates retaining (preserving) the (desired) primitive rendering order. (As is known in the art, in many cases the primitive rendering order specified by an application that requires graphic processing is required to be maintained when the primitives are rendered. The technology described herein may accordingly be configured to achieve this).

This may be achieved as desired, but in an embodiment is achieved by assigning the primitive sub-sets to the leaf nodes in the order of the primitives' indices, from the leaf node at one edge of the tree to the leaf node at the other edge of the tree (so from left-to-right, or from right-to-left). Other arrangements that facilitate preserving (reproducing) the desired rendering order could be used, if desired.

The leaf nodes each represent a given sub-set that the set of primitives has been divided into. Each higher node in the tree represents the combination of the sub-sets of primitives that each of its child nodes represents. Thus, for example, a parent node that has two leaf nodes as its child nodes will represent the combination of the two sub-sets of primitives that the two child leaf nodes represent. This is repeated up the tree representation for each higher node (such that the root node of the tree will represent the entire set of primitives in question).

Each node of the tree may have any desired and suitable number of child nodes. In an embodiment, the tree structure is balanced and/or symmetrical. Each parent node may have two child nodes.

In an embodiment, the tree structure has power of two number of leaf nodes.

Other arrangements for the tree structure would be possible, if desired.

For each node of the tree representation, data indicating: the sub-set of primitives that the node represents; the vertices associated with that sub-set of primitives; and the region of space that that sub-set of primitives falls within, is stored. Other data could also be stored for a node and/or for each node, if desired.

The data that indicates the sub-set of primitives that a node represents can take any suitable and desired form. It may indicate the range of primitives, and the range of primitive positions (e.g. the range of primitive indices), for the primitive sub-set (that the sub-set encompasses). The data may indicate the start position (in the primitive sequence) for (e.g. the start index for) the sub-set and the number of primitives in the sub-set of primitives, for the node in question. Other arrangements would, of course, be possible, if desired.

The data that indicates the vertices that are used by the primitives for a node can similarly take any desired and suitable form. Each primitive will have an associated set of vertices, and the vertices may also be indexed, such that respective individual vertices can be identified. Thus each vertex may have an associated index that identifies the vertex. The vertex indexing need not be, and typically will not be, the same as the primitive indexing, and two (or more) primitives may share vertices if desired.

In one embodiment, the data that indicates the vertices associated with the sub-set of primitives for a node indicates for each vertex associated with the set of primitives, whether that vertex is associated with the sub-set of primitives for the node or not. For example, each node could have associated with it a bit map (bit field) representing all the vertices (for the set of primitives), with the bits in the vertex bit map being set accordingly to indicate which of the vertices are associated with the primitives that are associated with the node in question.

In another embodiment, each node has associated with it one or more vertex index ranges indicating the (indices of) the vertices that are associated with the node. Using ranges of vertex indices may reduce the cost of building the tree representation for the set of primitives and may require less data than storing a vertex bit map for each node.

In this case, there may be a single vertex index range stored for the node, or there may be plural vertex index ranges (e.g., (each) separated by a "gap" of vertex indices (vertices) that are not associated with the node).

In an embodiment, the number of vertex index ranges that is used may be based on the relative cost or overhead for generating a vertex index range, and the relative cost of unnecessarily processing vertices that are included in a vertex index range but which are not in fact actually associated with a primitive in the sub-set of primitives that the node represents (such that the processing of those vertices would not in fact be necessary and so it would be desirable to exclude them from the node for that region). This reflects the fact that producing and storing more vertex index ranges for a node may be more costly, but conversely may reduce the amount of unnecessary vertex processing that is done when the set of primitives is rendered.

In an embodiment, if the interval (the number of indices (the index count)) between one vertex index for a vertex for a primitive in the sub-set of primitives and the next vertex index for a primitive in the sub-set of primitives (in the vertex index order) exceeds a particular, e.g. predetermined, threshold value, then a new vertex index range is started (and stored) at and for the next (used) vertex index for the sub-set of primitives. Conversely, if the interval (the number of indices (the index count)) between one vertex index for a vertex for a primitive in the sub-set of primitives and the next vertex index for a primitive in the sub-set of primitives does not exceed a particular, e.g. predetermined, threshold value, then a single range encompassing both indices (and any other indices to either side of those indices that do not exceed the threshold interval) is used.

In other words, if using two separate vertex index ranges would skip less than, or less than or equal to, a selected threshold number of vertices (vertex indices), then a single continuous vertex index range may be used instead of the two separate vertex index ranges, but if using two separate vertex index ranges would skip more than a selected threshold number of vertices (vertex indices), then two separate vertex index ranges may be used instead of a single continuous vertex index range.

Thus, in an embodiment, the number of vertex index ranges to use for a node is based on the number of vertices (the number of vertex indices) that there would be in the intervals between respective vertex index ranges that could be used for the node (i.e. on the number of vertices that would be skipped by using (spaced-apart) smaller ranges of vertex indices instead of larger ranges of vertex indices that encompasses the smaller ranges (and the interval (gap) between them)).

This process may be considered (and repeated) across the vertex index range that the vertices associated with the primitives in the sub-set of primitives spans, so as to sub-divide (or not) that vertex index range into one or more vertex index ranges that are then associated with the node in question.

In an embodiment, the threshold number of vertices (the vertex index count) that triggers the starting of (the use of) a new range is based on the hardware cost of beginning a new range.

Other arrangements would, of course, be possible.

Where vertex index ranges are associated with a node, then the data indicating the vertex index ranges for a node can take any desired and suitable form. In an embodiment, data indicating the number of vertex index ranges and data indicating, for each range, the start and end (the minimum and maximum) vertex index values for the range, is generated and stored.

The data indicating the volume of space that the sub-set of primitives for a node falls within can similarly take any desired and suitable form. This data should indicate the volume in the object space that the object is defined in that the sub-set of primitives for a node falls within.

In an embodiment, the volume-indicating data indicates a bounding volume that encompasses all of the primitives in the sub-set of primitives. An axis aligned bounding volume may be determined and stored. The minimum and maximum values in each axis direction (e.g. x, y, z) for all the vertices that the node encompasses may be determined and stored as indicating the region of space that the node relates to (encompasses). Other, e.g. more sophisticated, forms of bounding volume, e.g., could be used if desired.

The tree representation for the set of primitives can be built (the data for it generated) in any desired and suitable manner. In an embodiment, the leaf nodes are built first, using the data for the respective sub-set of primitives for the leaf node in question, with the (and each) higher level node (e.g. including the root node) then being built from its respective child nodes (by "merging" its respective child nodes). Thus in an embodiment, the data for a "parent" node is determined and by combining or merging the data from its child nodes (in an appropriate manner). "Constructing" higher level nodes (parent nodes) from their respective child nodes helps to minimise the number of passes over the "raw" data that will be required.

When merging two (or more) child nodes, then the merging can be done in any suitable and desired manner to provide a "merged" set of data for the higher level (parent) node. Thus, for example, in the case of the sub-set of primitives that the node is to represent, the primitive sub-sets (e.g. index ranges) for the child nodes may be combined to provide a (larger) primitive sub-set (e.g. index range) for the parent node.

In the case of the vertices to be associated with a parent node, where the child nodes have vertex index bit maps associated with them, the child node bit maps can be ORed together to provide a vertex index bit map for the parent node.

Where the child nodes have vertex index ranges associated with them, then the parent node could simply have all the child nodes' vertex index ranges associated with it. However, in an embodiment, the vertex index ranges for the child nodes may be (selectively) merged into new ranges for the parent node (where it is appropriate to do that). In this case, if two child node vertex index ranges overlap, or are separated by less than or equal to a threshold number of vertex indices (as discussed above), the two child node vertex index ranges may be merged (combined) into a single combined vertex index range for the parent node. This may be repeated across all the vertex index ranges of the child nodes.

So far as the data indicating the region that the sub-set of primitives falls within is concerned, the region for a higher level node may be determined from the respective regions (e.g. bounding volumes) for the child nodes in question. For example, a bounding volume for the parent node that entirely encompasses all the bounding volumes of the child nodes could be determined (and in one embodiment this is done). In this case, the bounding volume for the parent node could be generating by taking the minimum and maximum vertex position values along each axis across all of the parent node's child nodes.

More sophisticated arrangements, such as more sophisticated forms of bounding volume could be used or desired. It would also be possible, e.g., to retain the separate bounding volumes of the child nodes for a parent node, or to only merge some but not all of the child node bounding volumes for a parent node, if desired. This may be appropriate where, e.g., the bounding volumes of the child nodes do not overlap at all.

Although the technology described herein could be used for each and every set of primitives (e.g. drawcall) that falls to be processed, the Applicants have recognised that there may be situations where it may be less desirable to perform the process of the technology described herein, rather than to simply process the set of primitives in the normal manner. This could be the case, e.g., in situations where the cost of preparing and using the tree structure may not be outweighed by the reduction in vertex processing that is achieved thereby.

Thus, in an embodiment, the technology described herein is used for selected sets of primitives only, and it may be determined whether to use the technology described herein for a set of primitives (e.g. drawcall) before using the technology described herein for the set of primitives.

In one such embodiment, a criteria for determining whether to use the process of the technology described herein is the spatial coherency of the set of primitives. Thus, a measure of the spatial coherency of set of primitives may be determined, and if the spatial coherency is determined to be below (or equal to or below) a threshold spatial coherency measure, the process of the technology described herein is not used for the set of primitives. This allows for the fact that using the technology described herein for sets of primitives having low spatial coherency may be unlikely to provide much benefit over "normal" processing of the set of primitives.

In this case any desired measure of the spatial coherency of the set of primitives can be used. In view of the likely cost of measuring the true spatial locality for each node, an estimate of the spatial coherency of the set of primitives may be used for this purpose.

Any suitable such estimate can be used, but in an embodiment the average vertex index interval (number of vertices between succeeding vertices for the set of primitives) is determined and used as a measure of the spatial coherency of the set of primitives. Then, if this average vertex index interval (distance) exceeds (or equals or exceeds) a threshold value, the set of primitives is considered to be spatially incoherent and so the process of the technology described herein is not used. The Applicants have recognised in this regard that the average index distance between vertices used for a set of primitives can be used as an indicator of the spatial coherency of the set of primitives in question (because objects to be rendered are likely to be indexed in the general order of the closest one next), and, moreover, can provide a relatively quick and low-cost mechanism for estimating the spatial coherency of the set of primitives.

Where it is determined not to use the process of the technology described herein for a set of primitives, then the set of primitives may simply be processed in the normal manner for the graphics processing system in question (i.e. the process of the technology described herein is omitted or bypassed).

The above describes the process of generating a tree representation for a set of primitives to be rendered. The technology described herein also extends to then using the tree representation to determine (identify) the primitives and vertices to be processed for the set of primitives when rendering the set of primitives to generate the output frame.

Thus, in an embodiment, the method of the technology described herein further comprises, and the apparatus of the technology described herein is further configured to, use the (data for the) tree representation to determine a set of primitives and a set of vertices to be processed when processing the set of primitives for the output frame.

Correspondingly, another embodiment of the technology described herein comprises a method of determining a set of primitives and a set of vertices to be processed when processing a set of plural primitives to be processed for a frame for output in a graphics processing system, the method comprising:

using data representing a tree representation representing the set of plural primitives to determine a set of primitives and a set of vertices to be processed when processing the set of primitives for the output frame; wherein:

the tree representation that the data represents is configured such that each leaf node of the tree represents one of a plurality of sub-sets of primitives that the set of primitives has been divided into, and each parent node of the tree represents a sub-set of primitives corresponding to the combination of the sub-sets of primitives of all of its child nodes;

and the data that is stored for each node of the tree representation indicates: the sub-set of primitives that the node represents; the vertices that are used by the primitives of the sub-set of primitives that the node represents; and the volume of space that the sub-set of primitives that the node represents falls within.

A further embodiment of the technology described herein comprises an apparatus for determining a set of primitives and a set of vertices to be processed when processing a set of plural primitives to be processed for a frame for output in a graphics processing system, the apparatus comprising:

processing circuitry configured to:

use data representing a tree representation representing the set of plural primitives to determine a set of primitives and a set of vertices to be processed when processing the set of primitives for the output frame;

wherein:

the tree representation that the data represents is configured such that each leaf node of the tree represents one of a plurality of sub-sets of primitives that the set of primitives has been divided into, and each parent node of the tree represents a sub-set of primitives corresponding to the combination of the sub-sets of primitives of all of its child nodes;

and the data that is stored for each node of the tree representation indicates: the sub-set of primitives that the node represents; the vertices that are used by the primitives of the sub-set of primitives that the node represents; and the volume of space that the sub-set of primitives that the node represents falls within.

As will be appreciated by those skilled in the art, these embodiments of the technology described herein can include any one or more or all of the optional features of the technology described herein, as appropriate. Thus, for example the tree representation and the data stored for the nodes of the tree may be of the form discussed above.

The tree representation can be used to determine the primitives and vertices to be processed for the set of primitives in any desired and suitable manner. The tree representation may be used to determine the primitives and vertices to be processed by considering nodes of the tree in turn, e.g. starting with the root node and working down the tree towards the leaf nodes (if required).

When a node of the tree is to be considered, it may be tested against the view frustum for the output frame being generated. The volume (region) of space that the sub-set of primitives for a node is indicated to fall within may be tested against the view frustum to determine if any of that volume (region) falls within the view frustum or not. Thus, in an embodiment, the bounding volume for a node is tested against the view frustum for the frame that is being rendered, to determine if any part of the bounding volume falls within the view frustum. This view frustum test can be performed in any desired and suitable manner, for example by clipping the, e.g., bounding volume, against the view frustum, using a bounding volume-view frustum intersection test, etc.

Where necessary, the bounding volume for a node may be transformed to the appropriate screen space position before it is tested against the view frustum. This may, use, e.g., a transformation matrix that provided as part of the vertex shading process. Indeed, the Applicants have recognised that in some cases it may only be appropriate to use the process of the technology described herein where such a transformation matrix exists.

Thus, as an embodiment it is determined if the vertex shader (vertex shading program) (if any) that is to be applied to the set of primitives uses a transformation on the vertices to transform them to screen space and if it does not, the method of the technology described herein is not used for the set of primitives. This allows for the fact that the transformation may need to be applied to the bounding volume for a node of the tree representation to allow the sub-set of primitives for the node to be tested against the view frustum.

In one such embodiment this determination is performed by the vertex shader complier recognising the pattern where a matrix multiplication on a vector is stored as a screen position, and if so, signaling that, e.g. by producing metadata that indicates a valid transformation matrix exists.

In an embodiment, the vertex shader complier is configured to extract the screen space transformation (the transformation matrix) (where a transformation exists in the vertex shader) and to provide it to (to provide access to the transformation matrix to) the node bounding volume testing process.

Thus, in an embodiment, the vertex shader complier is configured to analyse the vertex shader program for the set of primitives (e.g. draw call) to determine if the process of the technology described herein should be used, and to, if it is determined that the process of the technology described herein should be used, extract information from the vertex shader program (and e.g. a transformation to be applied to the vertices) for use when testing the bounding volume for a node of the tree representation against the view frustum.

The result of the view frustum test may be used to determine whether to include the sub-set of primitives and the set of vertices for the node in the set of primitives and the set of vertices to be processed. It may also or instead be used to determine whether and how to continue the traversal of the tree.

If a node passes the view frustum test completely (i.e. its bounding volume is completely within the view frustum), the sub-set of primitives and set of vertices for the node may then be included in (added to) the set of primitives and the set of vertices to be processed. In this case the traversal of the tree may then continue at the parent of the accepted node (and thus moves to the next child node of that parent node still to be tested (if any)).

Correspondingly, if a node fails the view frustum test completely (i.e. its bounding volume is completely outside the view frustum), the sub-set of primitives and set of vertices for the node may not be included in (added to) the set of primitives and the set of vertices to be processed. The traversal of the tree may then continue at the parent of the rejected node (and thus moves to the next child node of the parent node of the rejected node still to be tested (if any)).

(There is no need to test any nodes below a node found to fully pass or to fully fail the view frustum test, because the nature of the tree representation means that the tested higher level node provides the result for all those lower level nodes.)

If a node that is not a leaf node partially passes the view frustum test (e.g. its bounding volume is only partially (but not fully) within the view frustum), then the sub-set of primitives and set of vertices for the node may not be included in the set of primitives and the set of vertices to be processed at that stage, but instead the traversal of the tree may be continued to the child nodes of the node in question (which are then tested themselves).

Thus, in the case of the root node, if that node fully passes the view frustum test, the entire set of primitives and its associated set of vertices may be simply rendered in their entirety, and if the root node fails the view frustum test, the entire set of primitives may be rejected and not processed further, but if the root node only partially passes the view frustum test, the tree may be traversed to then test the child nodes of the root node.

Where there is no further child node of a parent node that is still to be tested, the traversal may continue at the parent node of the parent node in question (and thus moves to the next child node of the higher level parent node still to be tested (if any)).

If a leaf node is found to at least partially pass the view frustum test (i.e. its bounding volume is at least partially within the view frustum), then the sub-set of primitives and set of vertices for the leaf node may be included in the set of primitives and the set of vertices to be processed. Again the traversal of the tree may then continue at the parent of the accepted leaf node (and thus moves to the next leaf node of that parent node still to be tested (if any)).

This process is repeated until the tree has been completely traversed (until all the nodes in the tree that need to be tested, have been tested).

As discussed above, in an embodiment, the tree is traversed from the root node, working down towards the leaf nodes (if the traversal is to continue). The tree may be traversed in an order that will preserve the desired rendering order for the primitives in the set of primitives (so, e.g., from left-to-right where the tree was constructed in left-to-right order). As discussed above, this will depend upon the order in which the tree is constructed, and so the tree traversal order when using the tree should be based on the order that the tree was constructed in.

The traversal of the tree should be used to build up (generate) a set of primitives and a set of vertices to be processed. This can be done in any suitable and desired manner. A running, master list of primitives and running, master list of vertices may be maintained, and as nodes pass the view frustum test, the primitives and vertices for each new "passing" node may be added to (combined with) the existing master lists of primitives and vertices. Thus, in an embodiment, if the root node is partially visible, the tree is traversed, building up ranges of primitives (e.g. of primitive indices), and ranges of vertex indices or bit field (bit map) representations of vertex indices, to be processed.

The primitives and vertices for a node can be added to (merged with) the master lists in any suitable and desired manner.

For the primitives, the list of primitives (e.g. the primitive index ranges) for each accepted node (for each node that passes the view frustum test) could simply be added to the master primitive list.

In an embodiment, the "master" list of primitives to be processed is constructed by starting with all the primitives for the set of primitives in the master list, and then removing primitives (e.g., ranges of primitive indices) from the master list if and when nodes of the tree are rejected from further processing by the view frustum test.

For the vertices, the actual process that is used may depend upon the way that the vertex data is stored for the tree nodes.

For example, where the nodes have vertex index bit maps (bit fields) associated with them, then the master vertex list may correspondingly be maintained as a bit map (bit field), and the "master" bit map may be ORed with the vertex bit map for a node that passes the view frustum test to provide a merged, updated master vertex index bit map for the set of primitives.

Correspondingly, where the tree nodes have vertex index ranges associated with them, then the master vertex list may comprise the combination of all the "passing" nodes' vertex index ranges. In one such embodiment, the vertex index ranges for the tree nodes may be (selectively) merged into new vertices index ranges for the master vertex list (where it is appropriate to do that). This may be done in a corresponding manner to that discussed above when merging child nodes when constructing the tree representation. Thus, if two node vertex index ranges overlap, or are separated by less than or equal to a threshold number of vertex indices (as discussed above), the two node vertex index ranges may be merged (combined) into a single combined vertex index range for the master vertex index list.

In an embodiment, the "master" list of vertices to be processed is constructed by starting with no vertices in the list (an "empty" list), and then adding vertices (e.g., ranges of vertices indices) to the master list if and when nodes of the tree pass the view frustum test.

The output of the tree traversal should be a set of primitives and a set of associated vertices to be processed. This output can take any desired and suitable form, but may comprise a list or lists of primitives (e.g. a range or ranges of primitive indices) within the primitive stream for the set of primitives, indicating the primitives to be processed for the set of primitives, and a range or ranges of vertex indices, or a bit map of vertex indices, indicating the vertices to be processed for the set of primitives.

This primitive and vertex information may then, e.g., be provided to the rendering process (e.g. to the graphics processing unit (GPU) (graphics processor)) to indicate the primitives and vertices to be processed for the set of primitives (e.g. draw call) in question. The, e.g. GPU may then process (renders) the indicated primitives and vertices in the normal fashion for the graphics processing system in question to provide the desired render output. This processing can comprise, e.g., vertex shading, rasterisation, rendering (fragment shading), etc., as desired.

The technology described herein also extends to a method and system that both creates and then uses a tree representation for a set of primitives to be rendered in the manners discussed above.

The methods and apparatus of the technology described herein can be implemented in any appropriate and desired manner, e.g. in hardware or software (or both), and in (and be included in) any appropriate device or component.

In an embodiment, the tree structure is generated and used to produce the sets of primitives and vertices to be processed by a driver for the graphics processor (GPU) that is to perform the rendering operation. Thus, in an embodiment, the apparatus of the technology described herein comprises the driver for the graphics processor (GPU) that is to perform the rendering operation.

Correspondingly the technology described herein may be implemented and executed in a graphics processing system that includes a host processor (CPU) and a graphics processor (GPU), with the host processor executing a driver for the graphics processor, with the driver on the host processor generating the tree structure of the technology described herein, and using that tree structure to determine a set of primitives and vertices to be processed, and then indicating the so-identified sets of primitives and vertices to be processed to the graphics processor (which may then process the so-identified sets of primitives and vertices).

The tree structure can be generated and used at any desired and suitable point in the graphics processing operation. In an embodiment, this is done at draw call time.

The memory where the data representing the tree representing the bit of primitives is stored may comprise any suitable such memory and may be configured in any suitable and desired manner. For example, it may be an on-chip buffer or it may be an external memory (and, indeed, may be more likely to be an external memory). Similarly, it may be dedicated memory for this purpose or it may be part of a memory that is used for other data as well. In an embodiment, this data is stored in main memory of the system that incorporates the graphics processor.

All the data representing the tree representing the set of primitives may be stored in the same physical memory, although this is not essential.

Other memory arrangements would, of course, be possible.

The technology described herein can be implemented in any suitable system, such as a suitably configured microprocessor based system. In an embodiment, the technology described herein is implemented in a computer and/or micro-processor based system.

The technology described herein is particularly, but not exclusively, suitable for use in low power and portable devices. Thus, in an embodiment, the technology described herein is implemented in a portable device, such as a mobile telephone or PDA.

The technology described herein is applicable to any suitable form or configuration of graphics processor. It is particularly applicable to tile-based graphics processors and graphics processing systems. Thus in an embodiment, the graphics processor is a tile-based processor.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing system and pipeline can otherwise include any one or more or all of the usual functional units, etc., that graphics processing pipelines include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that further embodiments of the technology described herein comprises computer software specifically adapted to carry out the methods herein described when installed on a data processor, a computer program element comprising computer software code portions for performing the methods herein described when the program element is run on a data processor, and a computer program comprising codes adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus the technology described herein may further comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

An embodiment of the technology will now be described.

FIG. 1 shows a typical computer graphics processing system, comprising a host processor (CPU) 1, a graphics processing unit (GPU) 3, and a memory 5 for storing data required by and/or generated by the host processor 1 and GPU 3.

The graphics processor 3 in the present embodiment is a tile-based graphics processor, and includes a number of stages, namely: a vertex shader, a hull shader, a tesselator, a domain shader, a geometry shader, a rasterisation stage, an early Z (depth) and stencil test stage, a renderer (in the form of a fragment shading stage), a late Z (depth) and stencil test stage, a blending stage, a tile buffer and a downsampling and writeout (multisample resolve) stage. Other arrangements for the graphics processor 3 would, of course, be possible.

When an application 2 that is executing on the host processor 1 requires graphics processing from the GPU 3, such as a frame to be displayed, the application 2 will send appropriate commands and data to a driver 4 for the GPU 3 that is running on the host processor 1.

The driver 4 will then send appropriate commands to the graphics processor 3 to cause it to generate the graphics output required by the application 2.

The commands and data provided to the driver 4 will indicate, as is known in the art, a list of primitives to be rendered for the output frame to be generated by the graphics processor 3, together with an associated vertex array that includes the vertices to be used for the primitives for the output frame.

The output frame to be generated by the graphics processor 3 may, as is known in the art, typically be a frame intended for display on a display device, such as a screen or printer, but may also, for example, comprise intermediate data intended for use in later rendering passes (also known as a "render to texture" output), etc.

The primitives to be processed for the output frame are usually listed in the order that they are to be rendered. Each primitive will have associated with it a set of vertices which are referred to by their index in the associated vertex array.

To further facilitate the rendering operation, the primitives to be processed for an output frame will usually be organised into distinct draw calls, as is known in the art. For each draw call there will be a set of primitives to be processed, with each primitive in the set having associated with it a set of vertices which are referred to by their indices in the associated vertex array. The draw calls for an output frame are processed in turn to generate the output frame.

In normal graphics processing, the driver 4 will simply send commands and data to the graphics processor 3 to process all the primitives and vertices for each draw call in turn.

In the present embodiment this operation is modified by the driver 4 constructing, as will be discussed further below, tree representations of the sets of primitives to be processed for each respective draw call for an output frame, and then using those tree representations to derive a reduced set of primitives and vertices to be processed by the graphics processor 3 for the draw call in question. (Thus in this embodiment the technology described herein is implemented in the driver 4 and the GPU 3.)

Figure 2:
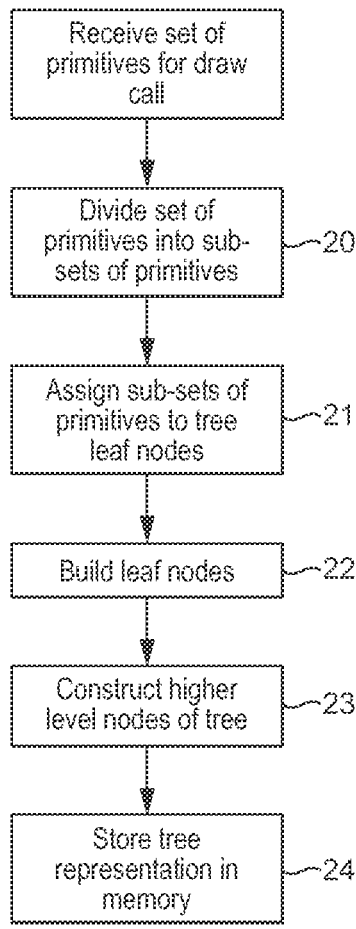
FIGS. 2, 3, 4 and 5 show schematically embodiments of the operation of the graphics processing system of FIG. 1 in accordance with the technology described herein.
Figure 3:
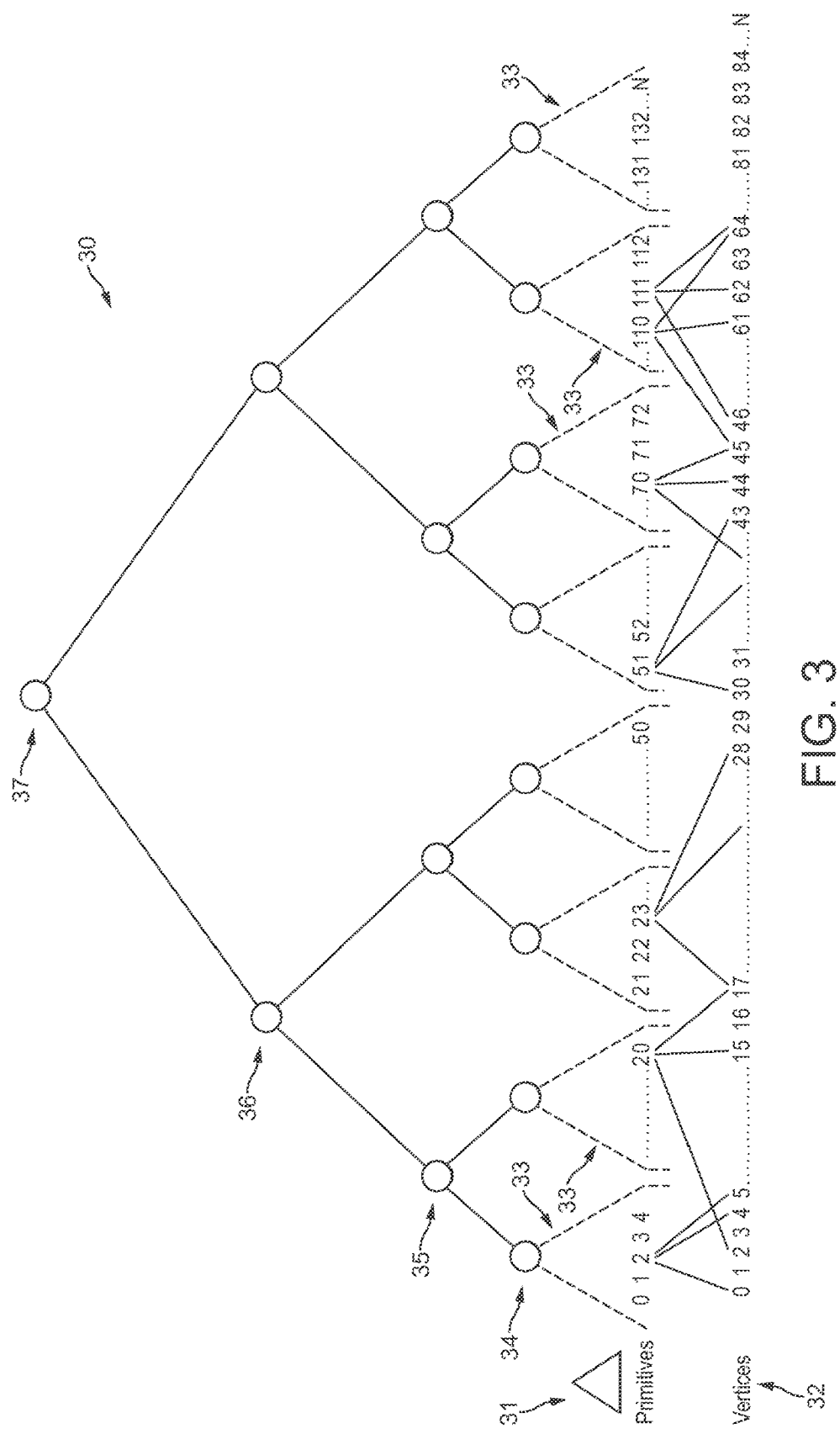

FIGS. 2 and 3 show schematically the process for generating a tree representation 30 for a set of primitives for a draw call that is used in the present embodiments. FIG. 2 is a flowchart showing the steps of the process, and FIG. 3 shows schematically the construction of the tree representation 30 itself.

As shown in FIG. 3, the draw call will indicate, inter alia, a set of primitives 31 to be processed for the draw call, which primitives will be listed in their desired rendering order. In the present embodiment it is assumed that the primitives in the set of primitives have associated indexes, in a continuous sequence, starting at zero, corresponding to the desired rendering order of the primitives. However, other arrangements could be used, if desired.

Also, it is not necessary for the primitives in the set of primitives to be listed in terms of associated index values as is shown in FIG. 3. For example, instead a list of vertices (vertex indices) could be provided that then is divided into groups of vertices (e.g. groups of three vertices in the case where the primitives are in the form of triangles) to thereby identify and indicate the respective primitives in the set of primitives. In this case, the primitives in the set of primitives would be identified and indicated by listing their vertices (such that there will be successive sets of vertices listed, with each set of vertices corresponding to a primitive in the set of primitives).

As shown schematically in FIG. 3 for some of the primitives only, each primitive in the set of primitives also has associated with it a set of vertices. In the present embodiments it is assumed that each primitive is a triangle, and so each primitive has associated with it a set of three vertices. The vertices are referenced by means of vertex indices into a vertex array 32 that indicates all the vertices that are to be used for the draw call. As shown in FIG. 3, the primitives may use vertices having different indices or may share vertices, and the set of vertices that is used for the set of primitives for the draw call need not be a continuous set of vertices from the vertex array.

As shown in FIG. 2, the first step in the process that the driver executes for generating the tree representation 30 is to divide the set of primitives for the draw call into plural sub-sets 33 of primitives (step 20).

In the present embodiment, the set of primitives for a draw call is divided into sub-sets 33 of primitives by dividing the range of index values for the set of primitives into plural equal (and continuous) sub-ranges of index values. Sub-dividing the set of primitives on this basis avoids any need to consider the spatial distribution of the primitives when assigning them to sub-sets and thus can be performed in a relatively fast and inexpensive fashion.

The sub-division is done such that each sub-set of primitives does not contain more than a selected threshold number of primitives, in this case 128 primitives.

However, the primitive set sub-division process is also subject to a constraint that the total number of sub-sets of primitives does not exceed a selected predetermined, threshold number of sub-sets, in this case 256 sub-sets. This constraint takes precedence, such that if the threshold number of sub-sets will be exceeded, the allowed number of primitives per sub-set is increased until the threshold number of sub-sets is not exceeded.

(It will be appreciated in this regard that FIG. 3 only shows some but not all of the primitive indices, sub-sets, vertices, primitive to vertex associations, etc., for clarity purposes.)

Once the set of primitives has been divided into plural sub-sets 33 of primitives, the driver constructs a tree representation of the set of primitives. The first stage in this process is to generate a leaf node 34 of the tree 30 for each respective sub-set 33 of primitives that the set of primitives has been divided into (step 21 in FIG. 2).

The primitive sub-sets 33 are assigned to the leaf nodes 34 for the tree by assigning the primitive sub-sets to the leaf nodes in the order of the primitives' indices, from the leaf node at one edge of the tree to the leaf node at the other edge of the tree (so from left-to-right, or from right-to-left). This facilitates preserving (reproducing) the desired rendering order when the tree representation is used.

The driver 4 then "builds" the leaf nodes (step 22 in FIG. 2) by finding the dimensions in object space that the primitives of the leaf node cover, and the vertices that the primitives of the leaf node use, and stores data indicating this information.

Thus, for each leaf node 34 of the tree representation 30, the driver 4 determines and stores: data indicating the sub-set of primitives that the node represents; data indicating the vertices that are used by the primitives of that sub-set of primitives; and data indicating the volume of space that that sub-set of primitives falls within.

The data that indicates the sub-set of primitives that a leaf node represents indicates the range of primitive indices for the primitive sub-set (that the sub-set encompasses), by indicating the start index for, and the number of primitives in, the sub-set of primitives for the node.

To determine the vertices that are used by the sub-set of primitives for a leaf node, the driver first scans the vertex indices for the primitives for the leaf node and sets a bit in a working bit buffer for each vertex that is used.

In one embodiment, the result of this vertex index scan is then used to construct a bit map (bit field) for the node that represents all the vertices in the vertex array for the set of primitives, with the bits in the vertex bit map being set accordingly to indicate which of the vertices are associated with the primitives that are associated with the node in question.

In another embodiment, the data that indicates the vertices associated with the sub-set of primitives for a leaf node (that indicates the vertices that are used by the primitives for a node) comprises one or more continuous vertex index ranges indicating the (indices of) the vertices that are associated with the node.

In this case, the driver scans the vertex index range that the vertices associated with the primitives in the sub-set of primitives spans as indicated by the working bit buffer, so as to sub-divide that vertex index range into one or more vertex index ranges that are then associated with the node in question.

In this operation, if the driver identifies an interval (a gap) in the vertex index count between one vertex index for a vertex for a primitive in the sub-set of primitives and the next vertex index for a primitive in the sub-set of primitives (in the vertex index order) and that interval (the number of indices (the index count)) between one vertex index for a vertex for a primitive in the sub-set of primitives and the next vertex index for a primitive in the sub-set of primitives exceeds a threshold interval value, then a new vertex index range is started (and stored) at and for the next (used) vertex index for the sub-set of primitives.

Conversely, if the interval (the number of indices (the index count)) between one vertex index for a vertex for a primitive in the sub-set of primitives and the next vertex index for a primitive in the sub-set of primitives does not exceed the threshold value, then a single range encompassing both indices and the "gap" between them (and any other indices to either side of those indices that do not exceed the threshold interval) is used.

In other words, if using two separate vertex index ranges would skip less than, or less than or equal to, a selected threshold number of vertices (vertex indices), then a single continuous vertex index range is used instead of the two separate vertex index ranges, but if using two separate vertex index ranges would skip more than a selected threshold number of vertices (vertex indices), then two separate vertex index ranges are used instead of a single continuous vertex index range.

Where vertex index ranges are associated with a node, data indicating the number of vertex index ranges and data indicating, for each range, the start and end (the minimum and maximum) vertex index values for the range, is generated and stored.

In the present embodiments, the data indicating the volume of space that the sub-set of primitives for a node falls within indicates a bounding volume that encompasses all of the primitives in the sub-set of primitives. To do this, the minimum and maximum values in each axis direction (e.g. x, y, z) for all the vertices that are used by the node are determined and stored as indicating the region of space that the node relates to (encompasses). Other, e.g. more sophisticated, forms of bounding volume, e.g., could be used if desired.

Once the leaf nodes 34 that each represent a given sub-set that the set of primitives has been divided into have been determined and "constructed", the higher level nodes 35, 36, 37 for the tree representation are determined and constructed (step 23 in FIG. 2). Each higher level node is built from its respective child nodes, by "merging" its respective child nodes so that each higher node in the tree represents the combination of the sub-sets of primitives that each of its child nodes represents. Thus, for example, a parent node 35 that has two leaf nodes 34 as its child nodes will represent the combination of the two sub-sets of primitives that the two child leaf nodes represent. This is repeated up the tree representation for each higher node until a root node 37 that represents the entire set of primitives in question is reached.

In the present embodiment, as shown in FIG. 3, each parent node of the tree has two child nodes. Other arrangements would, of course, be possible.

When merging child nodes, in the case of the sub-set of primitives that the parent node is to represent, the primitive index ranges for the child nodes are combined to provide a (larger) primitive index range for the parent node.

In the case of the vertices to be associated with a parent node, where the child nodes have vertex index bit maps associated with them, the child node bit maps are ORed together to provide a vertex index bit map for the parent node.

Where the child nodes have vertex index ranges associated with them, then the vertex index ranges for the child nodes are selectively merged into new ranges for the parent node where it is appropriate to do that. In particular, if two child node vertex index ranges overlap, or are separated by less than or equal to a threshold number of vertex indices (as discussed above), the two child node vertex index ranges are merged (combined) into a single combined vertex index range for the parent node. This is repeated across all the vertex index ranges of the child nodes.

So far as the data indicating the region that the sub-set of primitives falls within is concerned, the bounding volume for the parent node is generated by taking the minimum and maximum vertex position values along each axis across all of the parent node's child nodes.

Once the tree representation for the set of primitives for the draw call has been generated, it is then stored in memory for use (step 24 in FIG. 2).

The driver 4 then uses the tree representation to determine (identify) the primitives and vertices to be processed for the set of primitives when rendering the set of primitives for the draw call.

To use the tree representation to determine the primitives and vertices to be processed for the draw call, the driver traverses the nodes of the tree, building up a set of primitives and a set of vertices to be processed. The tree is traversed from the root node, working down towards the leaf nodes (if the traversal is to continue). The tree is traversed in an order that will preserve the desired rendering order for the primitives in the draw call (so from left-to-right where the tree was constructed in left-to-right order).

During the traversal, the driver tests the bounding volume for each node of the tree that is to be considered against the view frustum for the frame that is being rendered, to determine if any part of the bounding volume falls within the view frustum. This view frustum test is performed using a suitable bounding volume-view frustum intersection test.

Where necessary, the bounding volume for a node is transformed to the appropriate screen space position before it is tested against the view frustum. This may, use, e.g., a transformation matrix that provided as part of the vertex shading process.

To facilitate this, the compiler for the vertex shader (vertex shading program) is configured to determine if the vertex shading program that is to be applied to the draw call uses a transformation on the vertices to transform them to screen space, and to, if it does, extract the screen space transformation (the transformation matrix) and provide it to the node bounding volume-view frustum testing process.

The result of the view frustum test for a node is used to determine whether to include the sub-set of primitives and the set of vertices for the node in the set of primitives and the set of vertices to be processed for the draw call, and to determine whether and how to continue the traversal of the tree.

If a node passes the view frustum test completely (i.e. its bounding volume is completely within the view frustum), the sub-set of primitives and set of vertices for the node are then included in (added to) the set of primitives and the set of vertices to be processed for the draw call. The traversal of the tree then continues at the parent of the accepted node (and thus moves to the next child node of that parent node still to be tested (if any)).

Correspondingly, if a node fails the view frustum test completely (i.e. its bounding volume is completely outside the view frustum), the sub-set of primitives and set of vertices for the node are not included in (added to) the set of primitives and the set of vertices to be processed for the draw call. The traversal of the tree again then continues at the parent of the rejected node (and thus moves to the next child node of the parent node of the rejected node still to be tested (if any)).

If a node that is not a leaf node partially passes the view frustum test (e.g. its bounding volume is only partially (but not fully) within the view frustum), then the sub-set of primitives and set of vertices for the node are not included in the set of primitives and the set of vertices to be processed for the draw call at that stage, but instead the traversal of the tree is continued to the child nodes of the node in question (which are then tested themselves).

Where there is no further child node of a parent node that is still to be tested, the traversal continues at the parent node of the parent node in question (and thus moves to the next child node of the higher level parent node still to be tested (if any)) (continues with the higher level node to be tested next (if any)).

If a leaf node is found to at least partially pass the view frustum test (i.e. its bounding volume is at least partially within the view frustum), then the sub-set of primitives and set of vertices for the leaf node are included in the set of primitives and the set of vertices to be processed for the draw call. The traversal of the tree then continues at the parent of the accepted leaf node (and thus moves to the next leaf node of that parent node still to be tested (if any)).

This process is repeated until the tree has been completely traversed (until all the nodes in the tree that need to be tested, have been tested).

To generate the set of primitives and set of vertices to be processed as the tree is traversed, a running, master list of primitives and a running, master list of vertices is maintained, and as nodes pass the view frustum test, the primitives and vertices for each new "passing" node are combined with the existing master lists of primitives and vertices.

In the present embodiment, the "master" list of primitives to be processed is constructed by starting with all the primitives for the draw call in the master list, and then removing primitives (e.g., ranges of primitive indices) from the master list if and when nodes of the tree are rejected from further processing by the view frustum test.

For the vertices, the process that is used to build the "master" list depends upon the way that the vertex data is stored for the tree nodes.

Where the nodes have vertex index bit maps (bit fields) associated with them, then the master vertex list is correspondingly maintained as a bit map (bit field), and the "master" bit map is ORed with the vertex bit map for a node that passes the view frustum test to provide a merged, updated master vertex index bit map for the draw call.

Correspondingly, where the tree nodes have vertex index ranges associated with them, then the vertex index ranges for tree nodes that pass the view frustum test are merged into new vertex index ranges for the master vertex list. This is done in a corresponding manner to that discussed above when merging child nodes when constructing the tree representation. Thus, if two node vertex index ranges overlap, or are separated by less than or equal to a threshold number of vertex indices (as discussed above), the two node vertex index ranges are merged (combined) into a single combined vertex index range for the master vertex index list.

The output of the tree traversal is a set of primitives and a set of associated vertices to be processed for the draw call (in the form of a range or ranges of primitive indices within the primitive index stream for the set of primitives, indicating the primitives to be processed for the draw call, and a range or ranges of vertex indices, or a bit map of vertex indices, indicating the vertices to be processed for the draw call).

This primitive and vertex information is then provided by the driver 4 to the graphics processing unit (GPU) 3 to indicate the primitives and vertices to be processed for the draw call in question. The GPU 3 then processes (renders) the indicated primitives and vertices in the normal fashion for the graphics processing system in question to provide the desired render output for the draw call. This processing can comprise, e.g., vertex shading, rasterisation, rendering (fragment shading), etc., as desired.

It will be appreciated in this regard that because the set of primitives and the set of associated vertices to be processed for the draw call that is the output of the tree traversal will exclude any primitives and vertices associated with nodes of the tree that were rejected by the view frustum test, the process of generating and using the tree representation of the present embodiments accordingly allows a reduced set of primitives and set of associated vertices that are to be processed to be derived for a draw call, rather than simply providing to the graphics processing unit 3 all the primitives and vertices for the draw call for processing. This then facilitates in particular deriving a reduced or minimal set of vertices for processing for a draw call, and so reducing the vertex processing burden.

Figure 4:
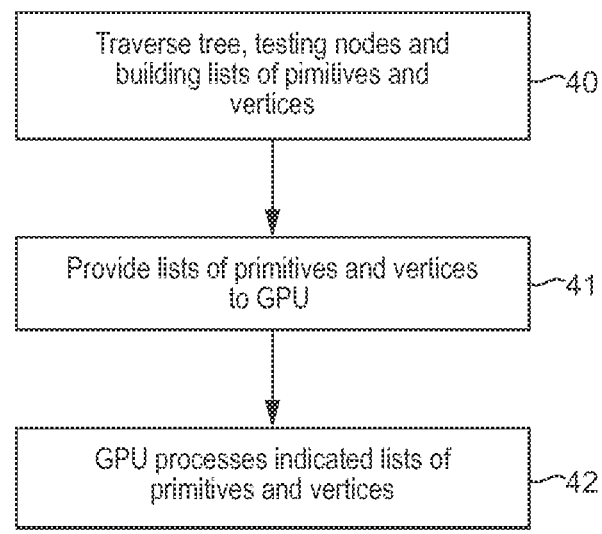
Figure 5:
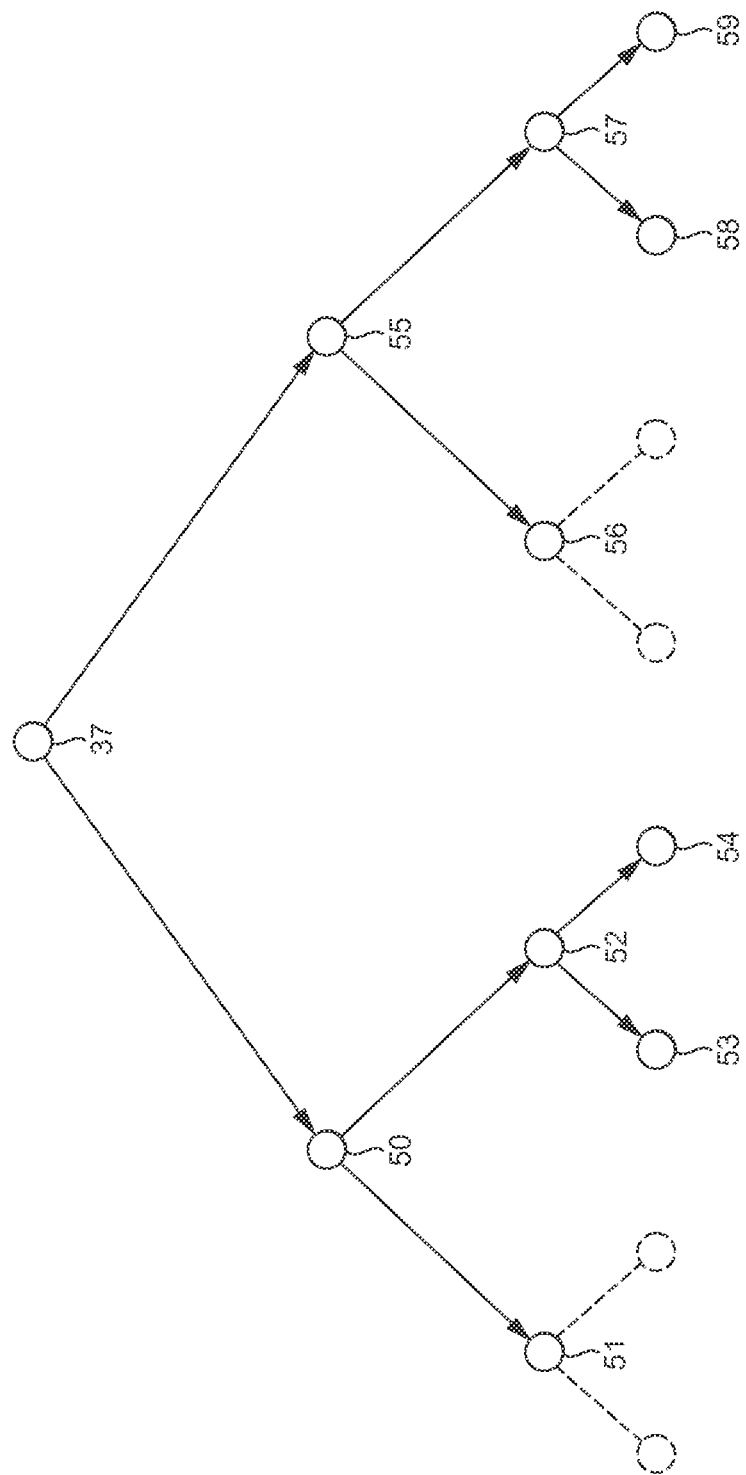

FIGS. 4 and 5 illustrate the use of the tree representation.

FIG. 4 is a flowchart showing the steps of the process of using the tree representation. As shown in FIG. 4, the process starts with the driver traversing the tree, testing the nodes of the tree against the view frustum and building lists of primitives and vertices using the results of those tests (step 40). The so-determined lists of primitives and vertices are then provided to the graphics processor 3 (step 41), and the graphics processor then processes the indicated lists of primitives and vertices for the draw call (step 42).

FIG. 5 shows schematically the traversal of the tree.

As shown in FIG. 5, the traversal starts at the root node 37. If the root node 37 fully passes the view frustum test, the entire set of primitives and its associated set of vertices for the draw call will be rendered in their entirety, and if the root node fails the view frustum test, the entire set of primitives for the draw call will be rejected and not processed further, but if the root node only partially passes the view frustum test, the tree is traversed to then test the child nodes of the root node.

For the purposes of the example shown in FIG. 5, it is assumed that the geometry (primitives) associated with the root node 37 when tested is found to lie partially within the view frustum. Thus, the left-most child node 50 of the root node is then tested (on the assumption that the tree has been constructed in left-to-right order, so that it should be traversed in left-to-right order to preserve the desired rendering order).

If when the node 50 is tested, it is again determined that the geometry for that node is partially within the view frustum, then its left-most child node 51 is tested. It is assumed in the example shown in FIG. 5 that the bounding volume for the node 51 is wholly within the view frustum and so the set of primitives and set of vertices for that node 51 are added to the master lists of vertices and primitives to be processed.

The traversal then returns to the parent node 50 of the node 51 without testing the leaf nodes of the node 51. The next child node 52 of the node 50 is then tested. In this case, it is assumed that the bounding volume for that node is only partially within the view frustum, and so the traversal continues to test the leaf nodes 53, 54 of the node 52. If the bounding volumes for the leaf nodes 53, 54 are at all within the view frustum (i.e. wholly or partially within the view frustum), then the sets of primitives and vertices for the leaf nodes are added to the master lists of vertices and primitives to be processed, but not otherwise.

Once the leaf nodes 53 and 54 have been tested, the traversal continues to the next child node 55 of the root node 37. Again, it is assumed in the example shown in FIG. 5 that the bounding volume for the node 55 is partially within the view frustum, and so its left-most child node 56 is then tested. In this case, it is assumed that the bounding volume for the child node 56 is wholly outside the view frustum, and so the primitives and vertices for the node 56 are not added to the master list of primitives and vertices, and the traversal then continues with the next child node 57 of the node 55.

In this case it is assumed that the bounding volume for the node 57 is partially within the view frustum, and so the leaf nodes 58, 59 of the node 57 are tested. If the bounding volumes for the leaf nodes 58, 59 are at all within the view frustum (i.e. wholly or partially within the view frustum), then the sets of primitives and vertices for the leaf nodes are added to the master lists of vertices and primitives to be processed, but not otherwise.

As the traversal of the tree is then complete, the so-derived master lists of primitives and vertices for the draw call are provided to the GPU 3 for processing.

This process is repeated for each draw call to be processed for an output frame in turn, until all the draw calls for the output frame have been rendered by the graphics processor 3. The process can then move on to the next output frame, and so on.

As will be appreciated by those skilled in the art, a number of modifications and/or variations to the present embodiment would be possible, if desired.

For example, although a tree representation could be generated and used for each and every draw call (set of primitives) that falls to be processed, the Applicants have recognised that there may be situations where it may be more desirable simply to process the set of primitives in the conventional manner. This could be the case, e.g., in situations where the cost of preparing and using the tree structure may not be outweighed by the reduction in vertex processing that is achieved thereby.

Thus, in an embodiment, a measure of the spatial coherency of each set of primitives to be processed is determined, and if the spatial coherency is determined to be below (or equal to or below) a threshold spatial coherency measure, a tree representation is not constructed and used for the set of primitives.

In this case, the average vertex index interval (number of vertices between succeeding vertices for the set of primitives) is determined and used as a measure of the spatial coherency of the set of primitives. Then, if this average vertex index interval (distance) exceeds (or equals or exceeds) a threshold value, the set of primitives is considered to be spatially incoherent and so a tree representation is not constructed and used for the set of primitives and the set of primitives is simply processed in the normal manner for the graphics processing system in question (i.e. the process of constructing and using a tree representation is omitted (bypassed)).

As will be appreciated from the above, embodiments of the technology described herein facilitates the determination of a reduced and minimal set of primitives and, in particular, of vertices, to be processed for a draw call, in circumstances where some or all of the primitives and vertices for a draw call may in fact lie outside the view frustum. This then facilitates reducing the primitive and vertex processing burden when the draw call is rendered.

This is achieved in the embodiments of the technology described herein at least, by constructing a tree representation of the set of primitives for a draw call, and then using that tree representation to determine the primitives and vertices to be processed for the draw call.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of processing a set of plural primitives to be rasterised and rendered for a frame for output in a graphics processing system, each primitive in the set of primitives being associated with one or more vertices, the method comprising:
dividing the set of primitives into plural sub-sets of primitives based on the rasterising and rendering order of the primitives in the set of primitives, wherein each primitive in the set of primitives has an associated index value that identifies the primitive and that indicates a position of the primitive in a rendering order of the set of primitives, and dividing the set of primitives into the plural sub-sets of primitives based on the rasterising and rendering order of the primitives in the set of primitives comprises dividing a range of index values for the set of primitives into plural sub-ranges of index values, to thereby provide plural sub-sets of primitives, each sub-set of primitives corresponding to a sub-range of the index values;
generating a tree representation for representing the set of primitives, the tree representation being configured such that the sub-sets of primitives are assigned to leaf nodes of the tree in an order based on the rasterising and rendering order of the primitives in the set of primitives, each leaf node of the tree represents one of the sub-sets that the set of primitives has been divided into based on the rasterising and rendering order of the primitives in the set of primitives, and each parent node of the tree represents a sub-set of primitives corresponding to the combination of the sub-sets of primitives of all of its child nodes;
generating and storing for each node of the tree representation: data indicating the sub-set of primitives that the node represents; data indicating the vertices that are used by the primitives of the sub-set of primitives that the node represents; and data indicating the volume of space that the sub-set of primitives that the node represents falls within;
traversing the generated tree representation in an order based on the rasterising and rendering order of the primitives in the set of primitives to determine a set of primitives and a set of vertices to be rasterised and rendered when processing the set of primitives for the output frame; and
rasterising and rendering the set of primitives and the set of vertices determined by traversing the generated tree representation for the output frame in an order based on the rasterising and rendering order of the primitives in the set of primitives.

2. The method of claim 1, wherein the set of primitives comprises the set of primitives for a draw call for the output frame.

3. The method of claim 1, wherein: the data that indicates the vertices that are used by the primitives for a node comprises a bit map that indicates the vertices that are used by the primitives that are associated with the node.

4. The method of claim 1, wherein: the data that indicates the vertices that are used by the primitives for a node comprises one or more vertex index ranges indicating the vertices that are used by the primitives that are associated with the node.

5. The method of claim 1, wherein: the tree representation for the set of primitives is constructed by constructing the leaf nodes first, and then constructing each higher level node by merging its respective child nodes.

6. The method of claim 5, wherein:
the child nodes have vertex index ranges associated with them;
and comprising, when merging the child nodes' vertex index ranges for a parent node:
when two child node vertex index ranges overlap, or are separated by less than or equal to a threshold number of vertex indices, combining the two child node vertex index ranges into a single combined vertex index range for the parent node.

7. The method of claim 1, comprising:
determining a measure of the spatial coherency of a set of primitives to be rasterised and rendered for a frame, and when the spatial coherency is determined to be below a threshold spatial coherency measure, not generating a tree representation for the set of primitives, but when the spatial coherency is determined to be above a threshold spatial coherency measure, generating a tree representation for the set of primitives.

8. The method of claim 1, wherein the graphics processing system comprises a host processor and a graphics processor, with the host processor executing a driver for the graphics processor, and the method comprises:
the driver on the host processor generating the tree representation for the set of primitives, using that tree representation to determine the set of primitives and the set of vertices to be rasterised and rendered, and then indicating the so-identified sets of primitives and set of vertices to be rasterised and rendered to the graphics processor; and
the graphics processor then rasterising and rendering the so-indicated set of primitives and set of vertices.

9. A method of determining a set of primitives and a set of vertices to be rasterised and rendered when processing a set of plural primitives to be rasterised and rendered for a frame for output in a graphics processing system, the method comprising:
traversing a tree representation representing the set of plural primitives in an order based on the rasterising and rendering order of the primitives in the set of primitives to determine a set of primitives and a set of vertices to be rasterised and rendered when processing the set of primitives for the output frame; and
rasterising and rendering the set of primitives and the set of vertices determined by traversing the tree representation for the output frame in an order based on the rasterising and rendering order of the primitives in the set of primitives;
wherein:
the tree representation is configured such that each leaf node of the tree represents one of a plurality of sub-sets of primitives that the set of primitives has been divided into based on the rasterising and rendering order of the primitives in the set of primitives, each parent node of the tree represents a sub-set of primitives corresponding to the combination of the sub-sets of primitives of all of its child nodes, and the sub-sets of primitives are assigned to leaf nodes of the tree in an order based on the rasterising and rendering order of the primitives in the set of primitives;

data is stored for each node of the tree representation that indicates: the sub-set of primitives that the node represents; the vertices that are used by the primitives in the sub-set of primitives that the node represents; and the volume of space that the sub-set of primitives that the node represents falls within; and each primitive in the set of primitives has an associated index value that identifies the primitive and that indicates a position of the primitive in a rendering order of the set of primitives, and division of the set of primitives into the plurality of sub-sets of primitives based on the rasterising and rendering order of the primitives in the set of primitives comprises division of a range of index values for the set of primitives into plural sub-ranges of index values, to thereby provide plural sub-sets of primitives, each sub-set of primitives corresponding to a sub-range of the index values.

10. The method of claim 9, comprising:
testing, for one or more nodes of the tree in turn, the volume of space that the sub-set of primitives for a node is indicated to fall within against the view frustum for the frame to determine if any of the indicated volume of space falls within the view frustum or not; and
using the result of the view frustum test to determine whether to include the sub-set of primitives and the set of vertices for the node in the set of primitives and the set of vertices to be rasterised and rendered.

11. The method of claim 10, comprising:
constructing a list of primitives to be processed when processing the set of primitives for the output frame by starting with all the primitives for the set of primitives in the list, and then removing primitives from the list when nodes of the tree are rejected from further processing by the view frustum test.

12. The method of claim 10, comprising:
constructing a list of vertices to be processed when processing the set of primitives for the output frame by adding vertices to a master list of vertices when nodes of the tree pass the view frustum test.

13. The method of claim 12, wherein the tree nodes have vertex index ranges associated with them, and when two node vertex index ranges overlap, or are separated by less than or equal to a threshold number of vertex indices, the two node vertex index ranges are merged into a single combined vertex index range for the master vertex index list.

14. The method of claim 9, further comprising:
a vertex shader complier analyzing the vertex shader program for the set of primitives to determine if the vertex shading program that is to be applied to the set of primitives uses a transformation on the vertices to transform them to screen space, and when it does extracting information about the screen space transformation from the vertex shader program for use when testing a node of the tree representation against the view frustum.

15. The method of claim 9, wherein the graphics processing system comprises a host processor and a graphics processor, with the host processor executing a driver for the graphics processor, and the method comprises:
the driver on the host processor generating the tree representation for the set of primitives, using that tree representation to determine the set of primitives and the set of vertices to be rasterised and rendered, and then indicating the so-identified sets of primitives and set of vertices to be rasterised and rendered to the graphics processor; and
the graphics processor then rasterising and rendering the so-indicated set of primitives and set of vertices.

16. An apparatus for processing a set of plural primitives to be rasterised and rendered for a frame for output in a graphics processing system, each primitive in the set of primitives being associated with one or more vertices, the apparatus comprising:
processing circuitry configured to:
divide the set of primitives into plural sub-sets of primitives based on the rasterising and rendering order of the primitives in the set of primitives, wherein each primitive in the set of primitives has an associated index value that identifies the primitive and that indicates a position of the primitive in a rendering order of the set of primitives, division of the set of primitives into the plural sub-sets of primitives based on the rasterising and rendering order of the primitives in the set of primitives comprises division of a range of index values for the set of primitives into plural sub-ranges of index values, to thereby provide plural sub-sets of primitives, each sub-set of primitives corresponding to a sub-range of the index values;
generate a tree representation for representing the set of primitives, the tree representation being configured such that the sub-sets of primitives are assigned to leaf nodes of the tree in an order based on the rasterising and rendering order of the primitives in the set of primitives, each leaf node of the tree represents one of the sub-sets that the set of primitives has been divided into based on the rasterising and rendering order of the primitives in the set of primitives, and each parent node of the tree represents a sub-set of primitives corresponding to the combination of the sub-sets of primitives of all of its child nodes;
generate and store for each node of the tree representation: data indicating the sub-set of primitives that the node represents; data indicating the vertices that are used by the primitives of the sub-set of primitives that the node represents; and data indicating the volume of space that the sub-set of primitives that the node represents falls within;
traverse the generated tree representation in an order based on the rasterising and rendering order of the primitives in the set of primitives to determine a set of primitives and a set of vertices to be rasterised and rendered when processing the set of primitives for the output frame; and
rasterise and render the set of primitives and the set of vertices determined by traversing the generated tree representation for the output frame in an order based on the rasterising and rendering order of the primitives in the set of primitives.

17. The apparatus of claim 16, wherein: the data that indicates the vertices that are used by the primitives for a node comprises a bit map that indicates the vertices that are used by the primitives that are associated with the node.

18. The apparatus of claim 16, wherein: the data that indicates the vertices that are used by the primitives for a node comprises one or more vertex index ranges indicating the vertices that are used by the primitives that are associated with the node.

19. The apparatus of claim 16, wherein the processing circuitry is further configured to:
determine a measure of the spatial coherency of a set of primitives to be rasterised and rendered for a frame, and, when the spatial coherency is determined to be below a threshold spatial coherency measure, not generating a tree representation for the set of primitives, but when the spatial coherency is determined to be above a threshold spatial coherency measure, generating a tree representation for the set of primitives.

20. An apparatus for determining a set of primitives and a set of vertices to be rasterised and rendered when processing a set of plural primitives to be rasterised and rendered for a frame for output in a graphics processing system, the apparatus comprising:
processing circuitry configured to:
traverse a tree representation representing the set of plural primitives in an order based on the rasterising and rendering order of the primitives in the set of primitives to determine a set of primitives and a set of vertices to be rasterised and rendered when processing the set of primitives for the output frame; and
rasterise and render the set of primitives and the set of vertices determined by traversing the tree representation for the output frame in an order based on the rasterising and rendering order of the primitives in the set of primitives;
wherein:
the tree representation is configured such that each leaf node of the tree represents one of a plurality of sub-sets of primitives that the set of primitives has been divided into based on the rasterising and rendering order of the primitives in the set of primitives, each parent node of the tree represents a sub-set of primitives corresponding to the combination of the sub-sets of primitives of all of its child nodes, and the sub-sets of primitives are assigned to leaf nodes of the tree in an order based on the rasterising and rendering order of the primitives in the set of primitives;
data is stored for each node of the tree representation that indicates: the sub-set of primitives that the node represents; the vertices that are used by the primitives of the sub-set of primitives that the node represents; and the volume of space that the sub-set of primitives that the node represents falls within; and
each primitive in the set of primitives has an associated index value that identifies the primitive and that indicates a position of the primitive in a rendering order of the set of primitives, and division of the set of primitives into the plurality of sub-sets of primitives based on the rasterising and rendering order of the primitives in the set of primitives comprises division of a range of index values for the set of primitives into plural sub-ranges of index values, to thereby provide plural sub-sets of primitives, each sub-set of primitives corresponding to a sub-range of the index values.

21. The apparatus of claim 20, wherein the processing circuitry is configured to:
test, for one or more nodes of the tree in turn, the volume of space that the sub-set of primitives for a node is indicated to fall within against the view frustum for the frame to determine if any of the indicated volume of space falls within the view frustum or not; and
use the result of the view frustum test to determine whether to include the sub-set of primitives and the set of vertices for the node in the set of primitives and the set of vertices to be rasterised and rendered.

22. The apparatus of claim 20, further comprising:
a vertex shader complier configured to analyze the vertex shader program for a set of primitives to determine if the vertex shading program that is to be applied to the set of primitives uses a transformation on the vertices to transform them to screen space, and, when the vertex shading program that is to be applied to the set of primitives uses a transformation on the vertices to transform them to screen space, extracting information about the screen space transformation from the vertex shader program for use when testing a node of the tree representation against the view frustum.

23. A non-transitory computer readable storage medium storing software code which when executing on a processor performs a method of processing a set of plural primitives to be rasterised and rendered for a frame for output in a graphics processing system, each primitive in the set of primitives being associated with one or more vertices, the method comprising:
dividing the set of primitives into plural sub-sets of primitives based on the rasterising and rendering order of the primitives in the set of primitives, wherein each primitive in the set of primitives has an associated index value that identifies the primitive and that indicates a position of the primitive in a rendering order of the set of primitives, and dividing the set of primitives into plural sub-sets of primitives based on the rasterising and rendering order of the primitives in the set of primitives comprises dividing a range of index values for the set of primitives into plural sub-ranges of index values, to thereby provide plural sub-sets of primitives, each sub-set of primitives corresponding to a sub-range of the index values;
generating a tree representation for representing the set of primitives, the tree representation being configured such that the sub-sets of primitives are assigned to leaf nodes of the tree in an order based on the rasterising and rendering order of the primitives in the set of primitives, each leaf node of the tree represents one of the sub-sets that the set of primitives has been divided into based on the rasterising and rendering order of the primitives in the set of primitives, and each parent node of the tree represents a sub-set of primitives corresponding to the combination of the sub-sets of primitives of all of its child nodes;
generating and storing for each node of the tree representation; data indicating the sub-set of primitives that the node represents, data indicating the vertices that are used by the primitives of the sub-set of primitives that the node represents; and data indicating the volume of space that the sub-set of primitives that the node represents falls within;
traversing the generated tree representation in an order based on the rasterising and rendering order of the primitives in the set of primitives to determine a set of primitives and a set of vertices to be rasterised and rendered when processing the set of primitives for the output frame; and
rasterising and rendering the set of primitives and the set of vertices determined using by traversing the generated tree representation for the output frame in an order based on the rasterising and rendering order of the primitives in the set of primitives.

* * * * *